(12) United States Patent
Nagasawa et al.

(10) Patent No.: US 7,218,728 B1
(45) Date of Patent: May 15, 2007

(54) TELEPHONE TERMINAL DEVICE

(75) Inventors: Naokazu Nagasawa, Kanagawa (JP); Rie Yanagisawa, Tokyo (JP); Shogo Iizuka, Kanagawa (JP); Hideyoshi Yoshida, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 552 days.

(21) Appl. No.: 09/595,204

(22) Filed: Jun. 16, 2000

(30) Foreign Application Priority Data

Jun. 18, 1999 (JP) ............................ 11-172923

(51) Int. Cl.
*H04M 1/00* (2006.01)

(52) U.S. Cl. .................... 379/387.01; 379/355.01; 455/564

(58) Field of Classification Search ........... 379/112.01, 379/142.01, 354, 355.01, 142.17, 355.05, 379/355, 904, 100.14; 707/1; 455/564; 370/259
See application file for complete search history.

(56) References Cited

U.S. PATENT DOCUMENTS

| | | | | |
|---|---|---|---|---|
| 5,062,132 A | * | 10/1991 | Yasuda et al. | 455/557 |
| 5,134,717 A | * | 7/1992 | Sogaard Rasmussen | 455/564 |
| 5,454,035 A | * | 9/1995 | Oba et al. | 379/354 |
| 5,568,546 A | * | 10/1996 | Marutiak | 379/355.05 |
| 6,005,927 A | * | 12/1999 | Rahrer et al. | 379/142.01 |
| 6,049,796 A | * | 4/2000 | Siitonen et al. | 707/3 |
| 6,223,057 B1 | * | 4/2001 | Sone | 455/564 |
| 6,320,943 B1 | * | 11/2001 | Borland | 379/112.01 |
| 6,618,586 B2 | * | 9/2003 | Inoue | 455/343.2 |

FOREIGN PATENT DOCUMENTS

| | | | |
|---|---|---|---|
| GB | 2 311 696 | | 10/1997 |
| GB | 2 331 890 | | 6/1999 |
| GB | 2 331 890 A | * | 6/1999 |
| JP | 4-134967 | | 5/1992 |
| JP | 5-176038 | | 7/1993 |
| JP | 10-126484 | | 5/1998 |
| JP | 10-304040 | | 11/1998 |

* cited by examiner

*Primary Examiner*—Sinh Tran
*Assistant Examiner*—Walter F Briney, III
(74) *Attorney, Agent, or Firm*—Pearne & Gordon LLP

(57) ABSTRACT

A power source is turned on by pressing a power source button in a key input part. Then, a telephone number is inputted from the ten keys in the key input part so that the telephone number is stored in a telephone number temporary memory part. After pressing a communication button in the key input part, conversation is held with the counterpart. Then, a finish button is pressed for finishing the communication. When it is finished, a list of telephone directories is displayed on a display device. In the case the input from the ten keys is the number information, the telephone directory for registration is selected from the "telephone directories 1 to 4" with different functions such that if the input is the number "1", the telephone directory 1 is selected, and if it is the number "2", the telephone directory 2 is selected. Furthermore, in the case of adding the name information to the telephone number, registration is executed in the selected telephone directory with the name information.

10 Claims, 14 Drawing Sheets

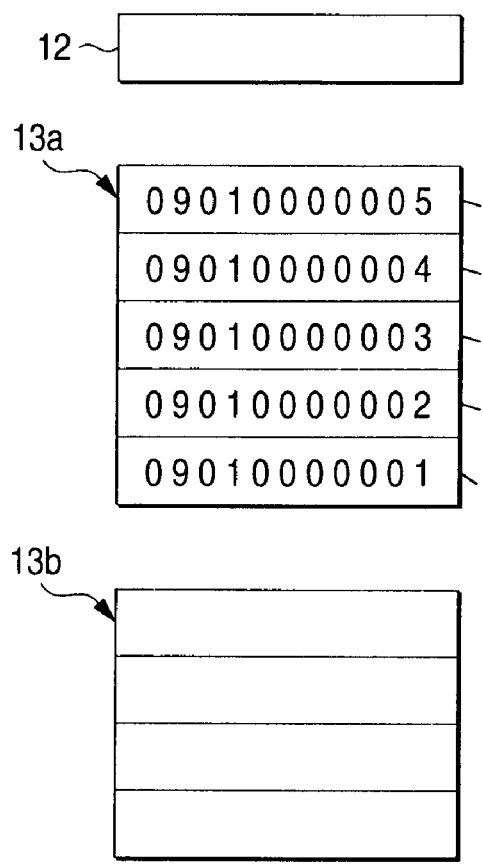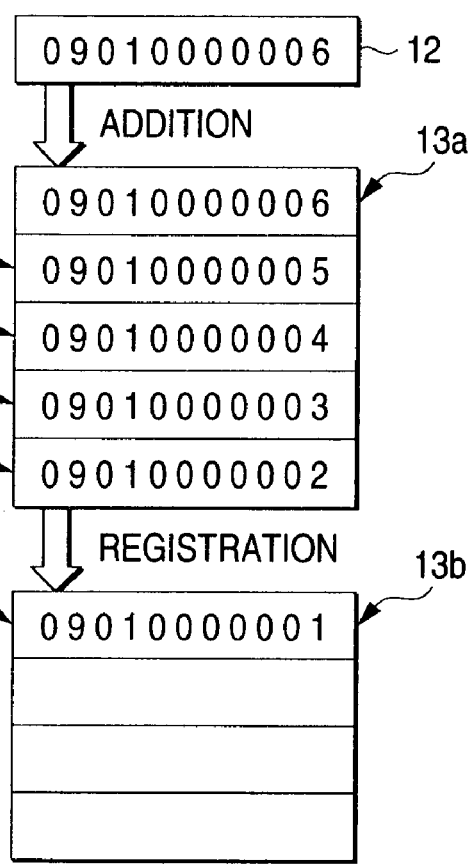

TRANSMISSION RECORD TO BE STORED

ACTUAL TRANSMISSION RECORD

TELEPHONE TERMINAL DEVICE

BACKGROUND OF THE INVENTION

The present invention relates to a telephone terminal device having an electronic telephone directory, more specifically, it relates to a telephone terminal device, wherein a telephone number called is registered in the electronic telephone directory.

Conventionally, in a telephone terminal device storing an electronic telephone directory, such as a telephone and a facsimile, data are not registered in the electronic telephone directory at the time of purchase so that the user needs to register telephone numbers in the telephone directory memory one by one after switching the device from the ordinary communication mode to the telephone directory registration mode. It is a considerable burden to the purchaser to carefully executing the registration operation without making an input mistake in the state unaccustomed to the device immediately after the purchase. However, without the data registration in the electronic telephone directory, the operation of inputting all the digits of a telephone number should be repeated in each call, and thus it is inconvenient.

The so-called redialing function of temporarily storing an inputted telephone number for retransmission (redialing) is known, but only one number is stored and numbers are overwritten successively in one memory. For the improvement thereof, JP-A-5-176038 proposes a method of increasing the number of temporary storage memories for accumulating inputted telephone numbers as the transmitted telephone number record so that a telephone number can be read out from the memories for making a call.

Moreover, JP-A-10-126484 proposes a method of effectively utilizing a memory in the transmission record. FIGS. 14A and 14B are explanatory charts of a transmission record in a conventional communication terminal device, wherein the telephone number of a counterpart after a call is stored in a memory of a record memory part with the date and the time. At the time, from the actual transmission record shown in FIG. 14A, only the latest one among the same numbers is stored and the others are erased as shown in FIG. 14B.

However, since new data are added successively in the memory as well as old data are erased successively in the case of JP-A-5-176038, it is also a method of successive overwriting. Furthermore, since new data are added when a memory is filled up as well as old or unnecessary data are erased in the case of JP-A-10-126484, it is a usage within the range of the conventional redialing function. Therefore, according to the conventional telephone terminal devices, because telephone numbers called include both those expected, at the time of the call, to be called repeatedly in the future and those expected not to be called any more, a problem is involved in that an efficient data administration capable of meeting the user's demand that the telephone numbers to be called repeatedly in the future should be kept in the telephone directory but a telephone number expected not to be called any more should be erased after passage of a predetermined time at a relatively early occasion possibly automatically cannot be provided.

SUMMARY OF THE INVENTION

Accordingly, an object of the invention is to provide a telephone terminal device for temporarily storing a telephone number inputted at the time of a call so as to be utilized in the conventional redialing as well as the called telephone number can be stored in an optional telephone directory memory in consideration of its characteristics, such as registration of the temporarily stored telephone number in a telephone directory memory for the transmission record, registration of the temporarily stored telephone number in an electronic telephone directory semi-permanently, registration of the telephone number with the related information such as the name added thereto as needed, and registration in a telephone directory memory with a time limit such that the registered telephone number is erased automatically after passage of a predetermined time.

Furthermore, another object of the invention is to provide a telephone terminal device capable of improving the utility value of an electronic telephone directory according to a combination of a plurality of telephone directory memories organically by keeping in a buffer memory an old telephone number registered in the transmitted telephone number record memory, which has conventionally been erased by overwriting, until passage of a predetermined time as well as erasing the same automatically after passage of the predetermined time.

Still another object of the invention is to provide a telephone terminal device capable of utilizing, in addition to a stored telephone directory memory, a telephone directory memory in an external memory device connected externally with the telephone terminal device in the same manner as the stored telephone directory memory.

In order to achieve the above-mentioned objects, a first aspect of the invention is a telephone terminal device comprising a temporary storage memory for temporarily storing an inputted telephone number, and a plurality of telephone directory memories, wherein a telephone number stored in the temporary storage memory is registered in one selected from the plurality of the telephone directories after making a call.

According to the telephone terminal device, the telephone directory memory for registering the called telephone number can be selected optionally from the plurality of the telephone directories provided in the telephone terminal device.

Moreover, a second aspect of the invention is a telephone terminal device comprising a temporary storage memory for temporarily storing an inputted telephone number, and a plurality of telephone directory memories, wherein a telephone number stored in the temporary storage memory is registered in one of the plurality of the telephone directories after making a call, with the name and the information related to the telephone number added thereto.

According to the telephone terminal device, the telephone number can be registered with the name and the information related to the telephone number added thereto, after inputting the telephone number for making a call.

Furthermore, a third aspect of the invention is a telephone terminal device comprising a plurality of telephone directories, wherein the data of at least one of the telephone directories are erased automatically after passage of a predetermined time.

According to the telephone terminal device, owing to the regular automatic erasure of the data, for example, new transmission record data can be accumulated and registered daily.

Moreover, a fourth aspect of the invention is the telephone terminal device comprising a transmitted telephone number record memory for storing a plurality of telephone numbers called, and a buffer memory, whose data are erased automatically after passage of a predetermined time, wherein telephone numbers are registered in the transmitted telephone number record memory in the order of call, and in the case the number of the telephone numbers to be registered exceeds the number capable of being stored in the transmitted telephone number record memory, the telephone number of the oldest registration order or a telephone number specified by the user is displaced from the transmitted telephone number record memory to the buffer memory for reregistration.

According to the telephone terminal device, telephone numbers overflowed beyond the capacity of the transmitted telephone number record memory can be redialed within the predetermined time.

Furthermore, a fifth aspect of the invention is the telephone terminal device comprising a temporary storage memory for temporarily storing an inputted telephone number, and a plurality of telephone directory memories, wherein an interface means for connection with an external memory device is provided.

Moreover, a sixth aspect of the invention is the telephone terminal device, wherein at least one of the telephone directory memories comprises an external memory device connected with a telephone terminal device main body via the interface means.

According to the telephone terminal device, since the inputted telephone numbers can be stored in the telephone directory memory of the external memory device connected with the telephone terminal device main body via the interface means, the memory capacity can be expanded.

Furthermore, a seventh aspect of the invention is the telephone terminal device comprising a temporary storage memory for temporarily storing an inputted telephone number, and a plurality of telephone directory memories, wherein the telephone directory memory for registering the telephone number stored in the temporary storage memory after a call is selected manually from the plurality of the telephone directory memories.

According to the telephone terminal device, the telephone directory memory for registering the telephone number can be selected also manually.

Moreover, an eighth aspect of the invention is the telephone terminal device comprising a temporary storage memory for temporarily storing an inputted telephone number, and a plurality of telephone directory memories, wherein the telephone directory memory for registering the telephone number stored in the temporary storage memory after a call is selected preliminarily from the plurality of the telephone directory memories so that the telephone number stored in the temporary storage memory is registered automatically in the preliminarily selected telephone directory memory after each call.

According to the telephone terminal device, the telephone directory memory for registering the telephone number can be selected preliminarily so that the telephone number can be registered automatically in the telephone directory at each call.

BRIEF DESCRIPTION OF THE DRAWINGS

FIGS. 10A and 10B are charts showing the memory content of the telephone directory memory shown in FIG. 9;

DETAILED DESCRIPTION OF THE PREFERRED EMBODIMENTS

First Embodiment

Hereinafter embodiments of the invention will be explained in detail with reference to drawings.

Figure 1:
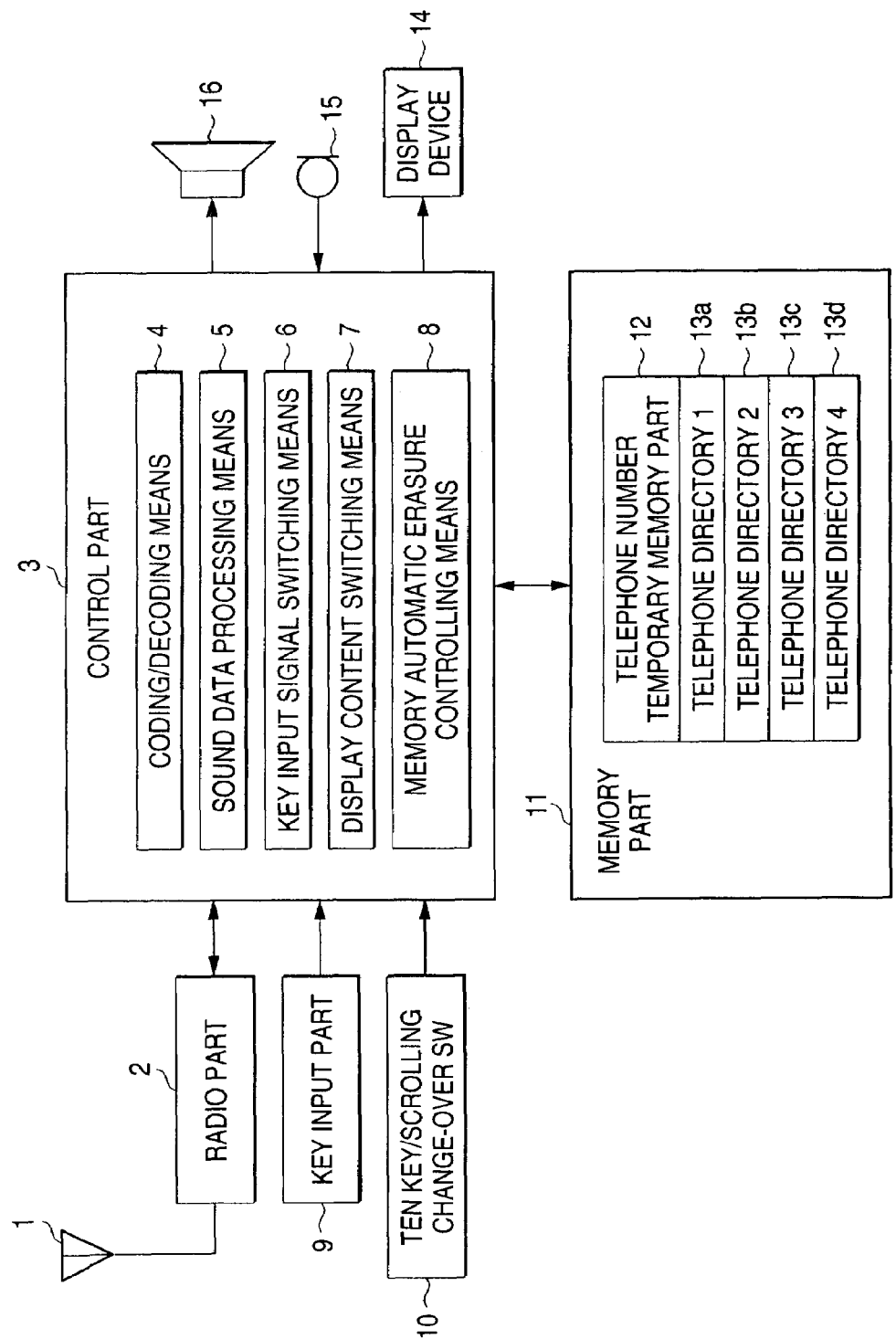
FIG. 1 is a block diagram showing the circuit configuration of a telephone terminal device according to a first aspect of the invention.
Figure 2:
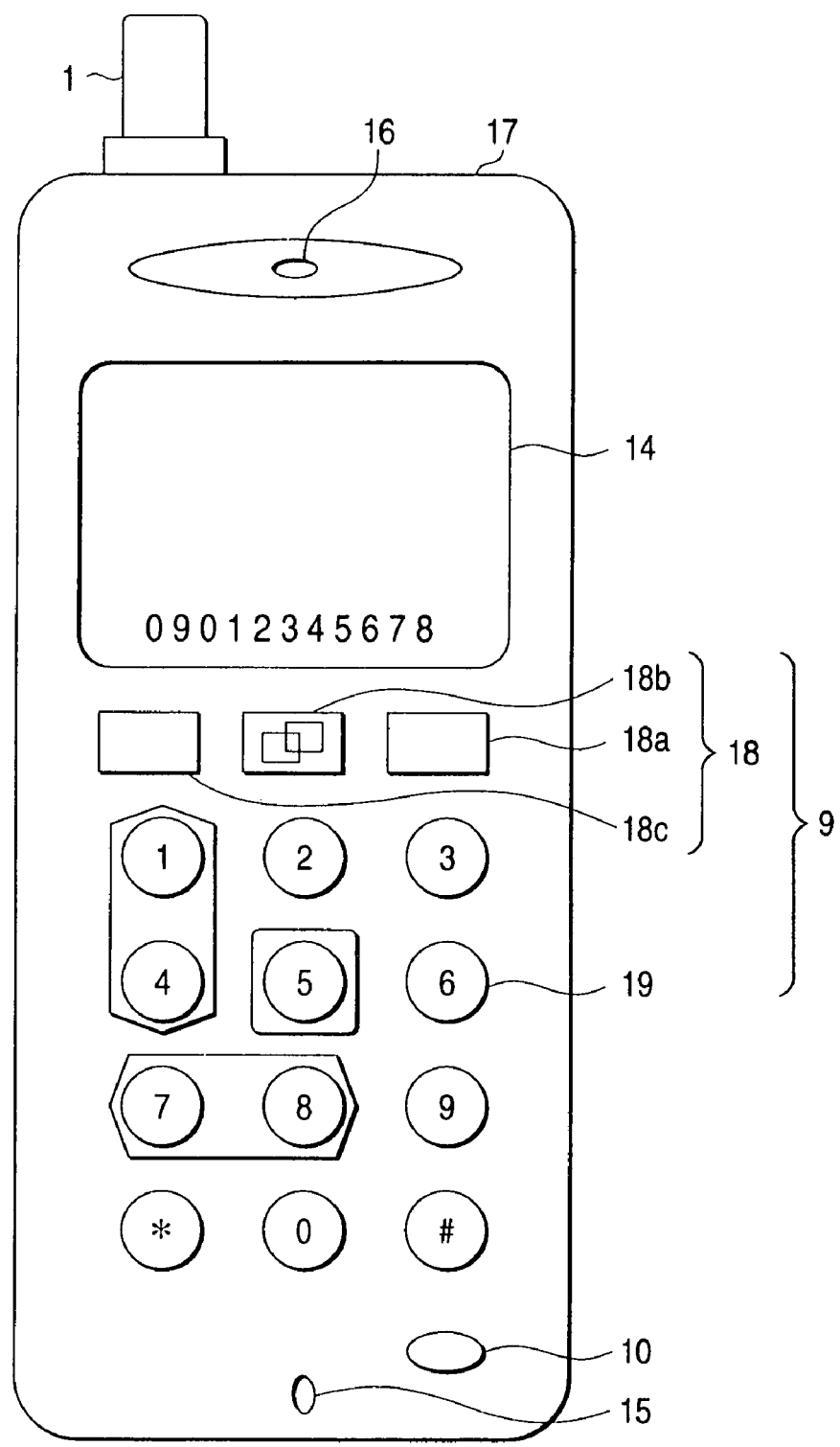
FIG. 2 is a plan view showing an operation surface of the telephone terminal device shown in FIG. 1.

FIG. 1 is a block diagram showing the circuit configuration of a telephone terminal device according to a first embodiment of the invention. FIG. 2 is a plan view showing an operation surface of the telephone terminal device shown in FIG. 1.

In FIG. 1, numeral 1 denotes an antenna, 2 a radio part, and 3 a control part. Numeral 4 denotes a coding/decoding means provided in the control part 3, 5 a sound data processing means 5 provided also in the control part 3, 6 a key input signal switching means, 7 a display content switching means for switching the display content on a display device, and 8 a memory automatic erasure controlling means. Numeral 9 denotes a key input part comprising ten keys and special keys, and 10 a ten key/scrolling change-over switch. Numeral 11 is a memory part comprising a telephone number temporary memory part 12 for temporarily storing a telephone number inputted from the key input part, and telephone directory memories 13a, 13b, 13c, and 13d each for storing telephone directory data of four telephone directories "telephone directory 1", "telephone directory 2", "telephone directory 3", and "telephone directory 4". As the telephone directory data, at least telephone numbers are registered. Further, numeral 14 denotes the display device, 15 a transmitter part comprising a microphone, and 16 a receiver part comprising a speaker.

In FIG. 2, the antenna 1, the transmitter part 15, the receiver part 16, the display device 14, the key input part 9 comprising special keys 18a, 18b, 18c, and ten keys 19, and the ten key/scrolling change-over switch 10 are disposed on a housing 17. An example of a 11-digit telephone number is shown on the display device 14.

Figure 3:
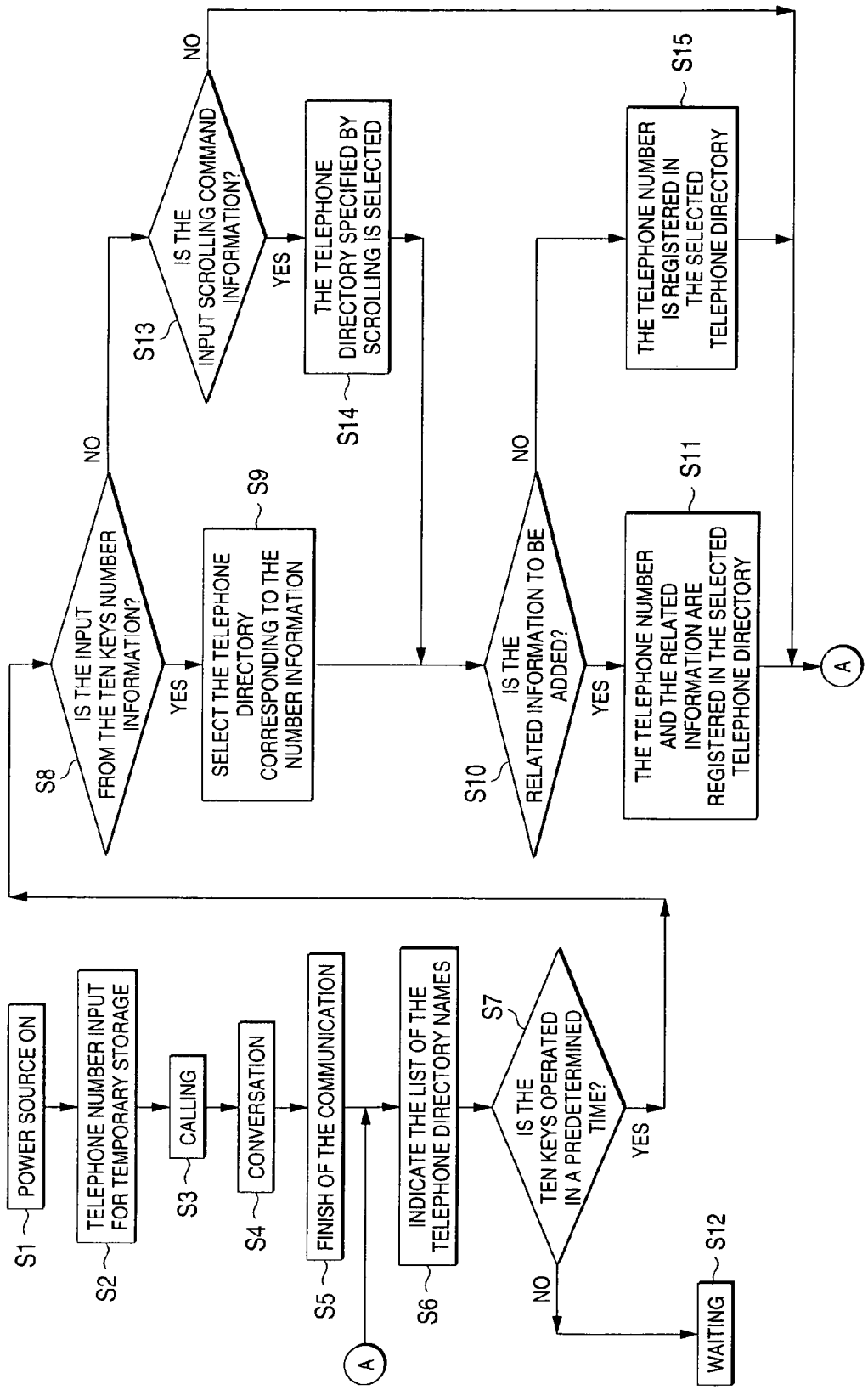
FIG. 3 is a flow chart of the operation of the telephone terminal device shown in FIG. 1.
Figure 4:
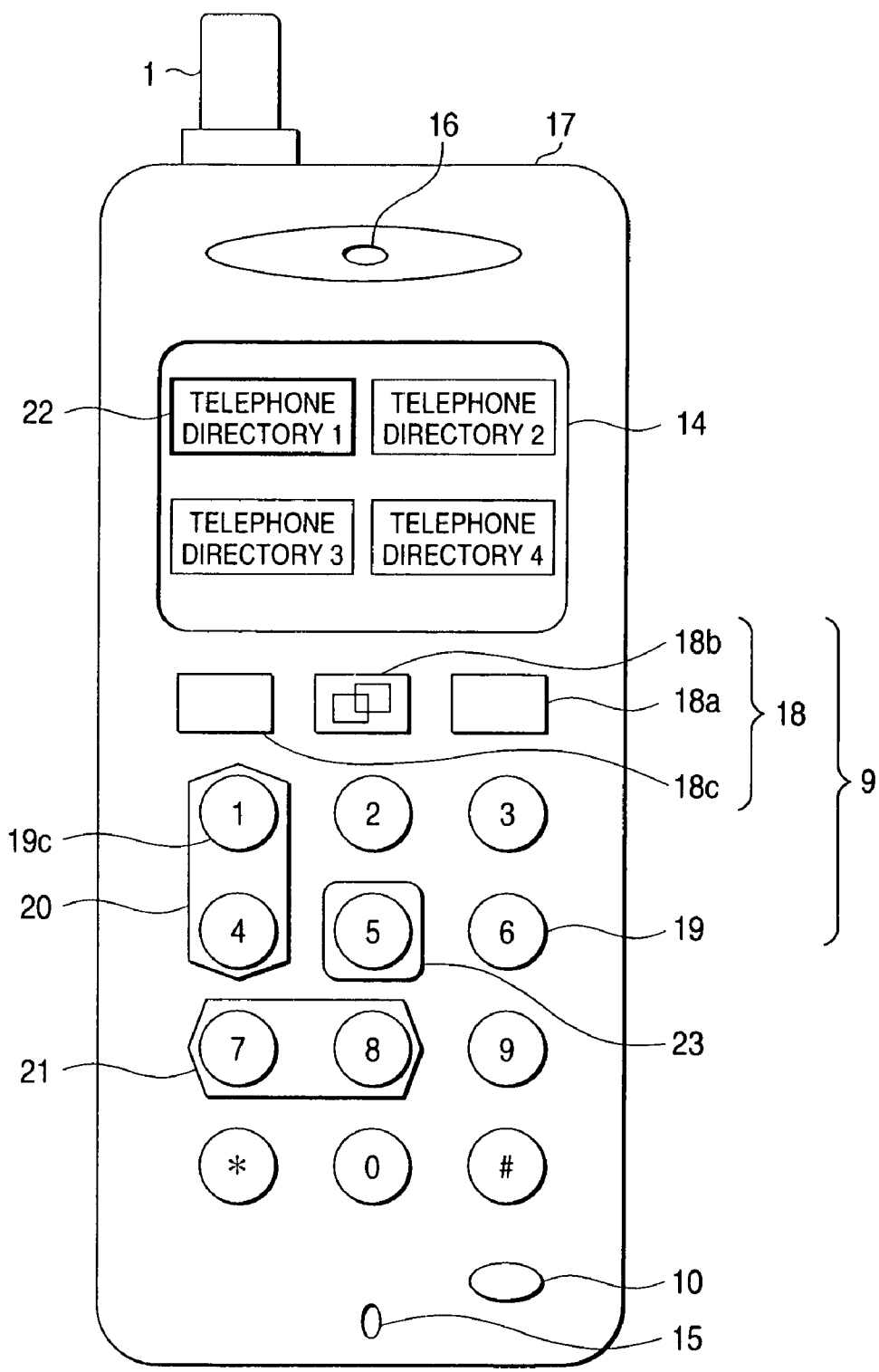
FIG. 4 is a plan view of the case with a telephone directory list indicated on the display device shown in FIG. 2.
Figure 5:
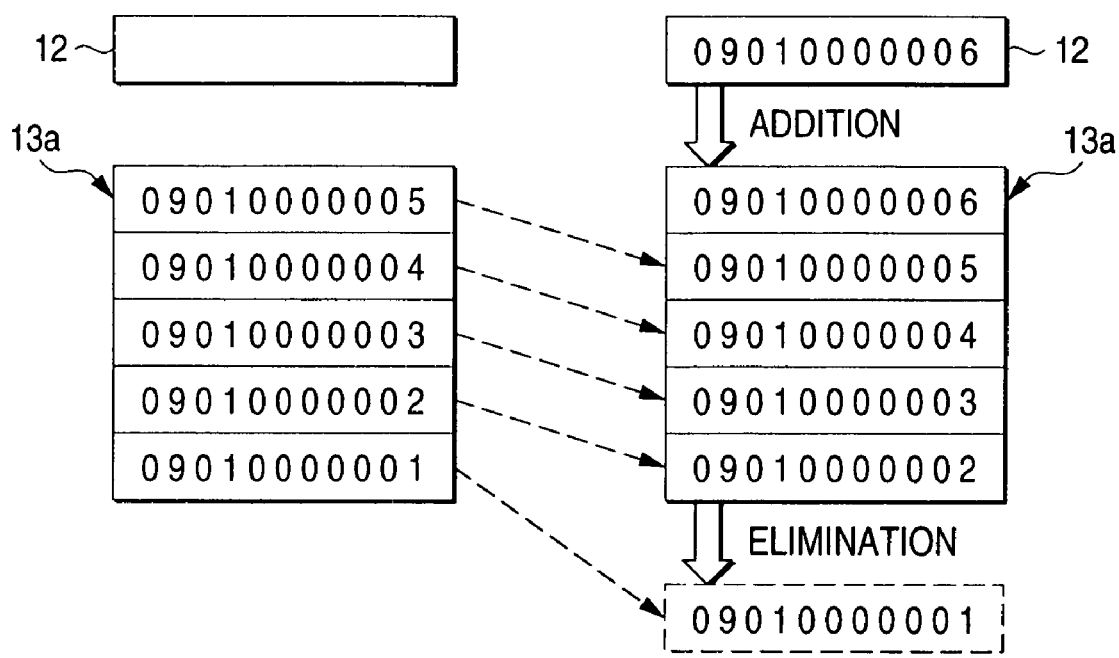
FIGS. 5A and 5B are charts showing the memory content of the telephone directory memory shown in FIG. 1.
Figure 6:
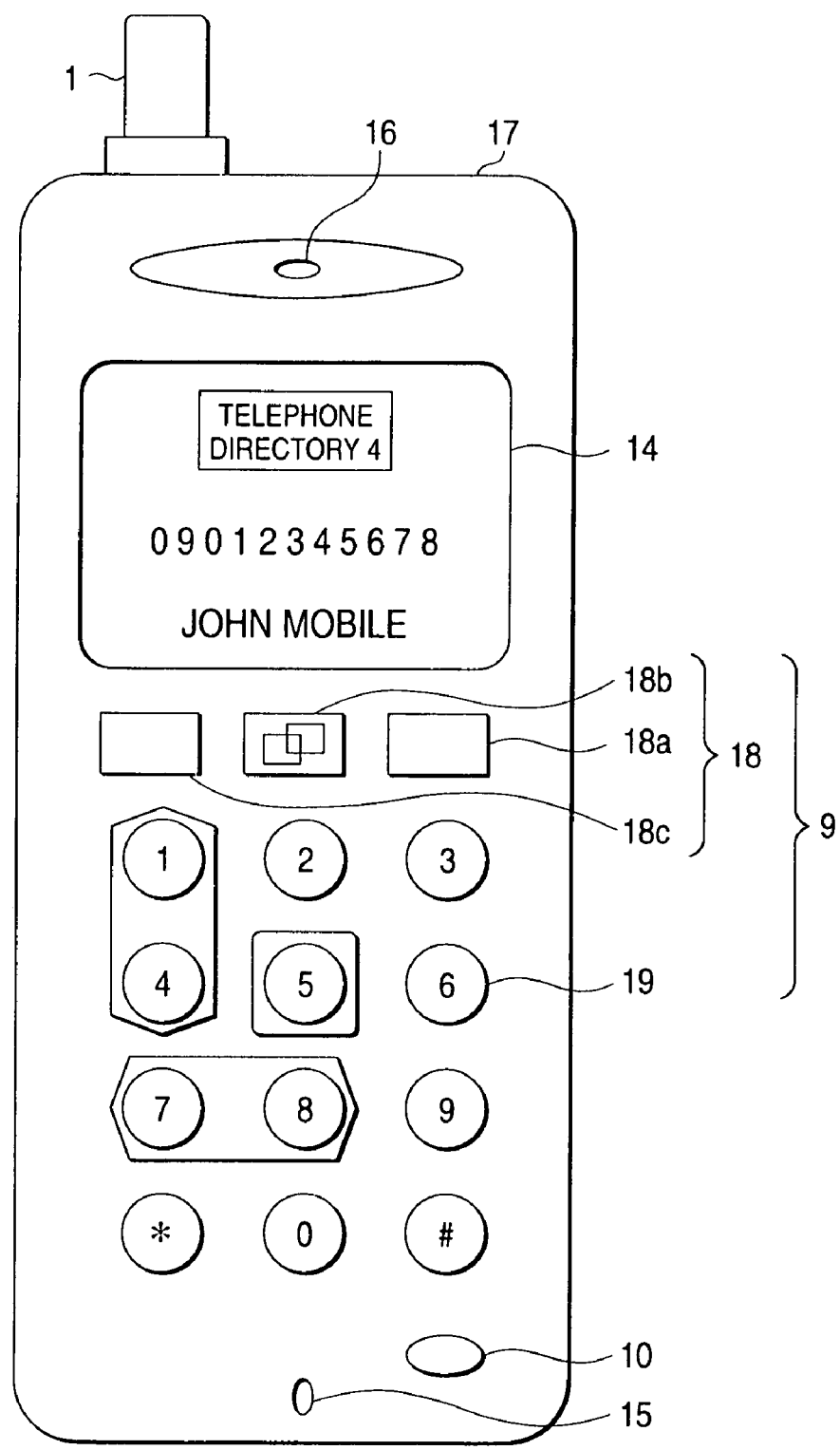
FIG. 6 is a plan view of the case with the related information indicated on the display device shown in FIG. 2.
Figure 7:
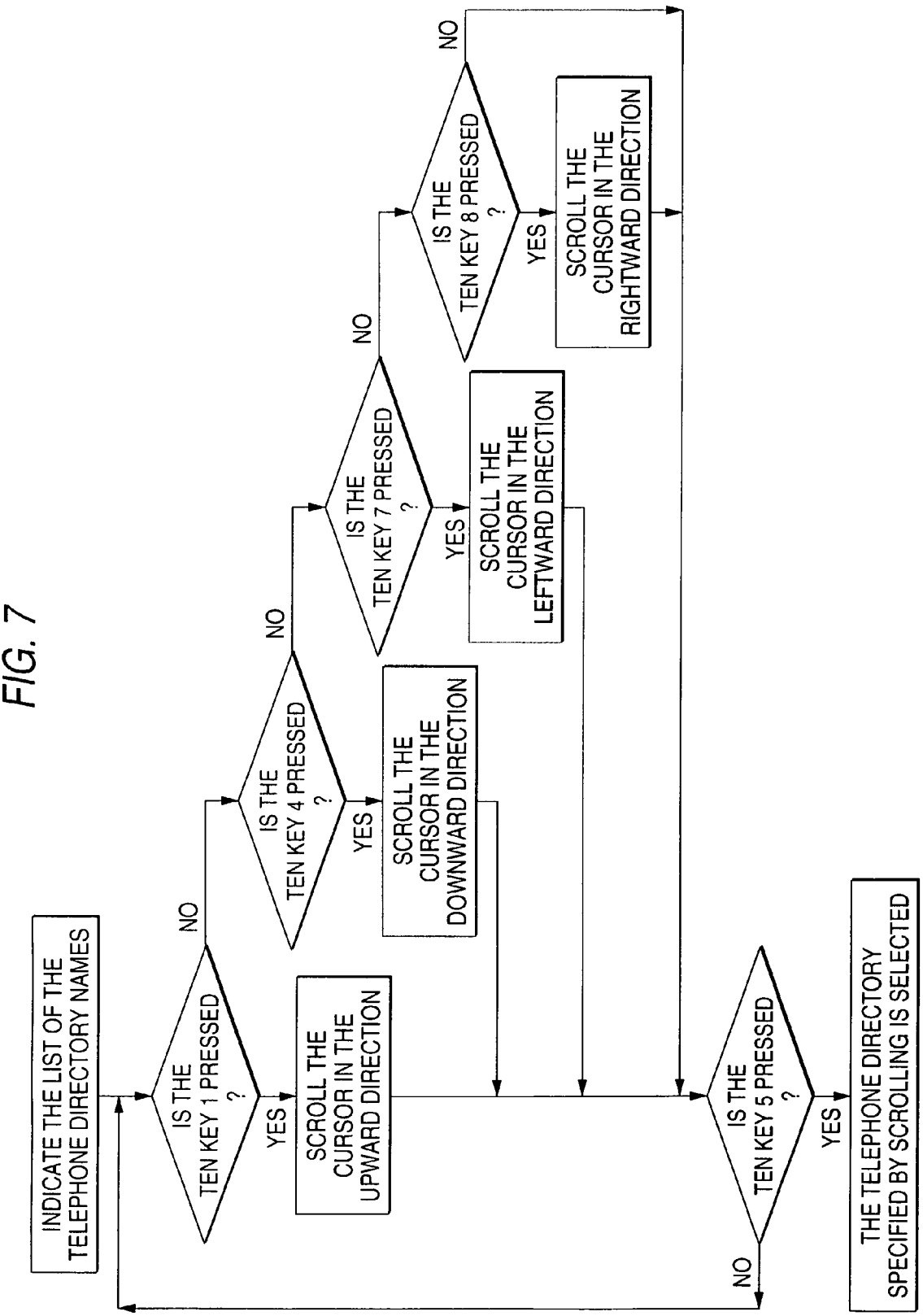
FIG. 7 is a flow chart showing the scrolling operation of FIG. 3.

FIG. 3 is a flow chart showing the registration operation of the telephone terminal device shown in FIG. 1. FIG. 4 is a plan view of the case with a telephone directory list indicated on the display device shown in FIG. 2. FIGS. 5A and 5B are charts showing the memory content of the telephone directory memory shown in FIG. 1. FIG. 6 is a plan view of the case with a name indicated on the display device shown in FIG. 2. FIG. 7 is a flow chart of the scrolling operation of the telephone terminal device shown in FIG. 1.

Next, the operation will be explained with reference to the above-mentioned drawings.

As shown FIG. 3, after pressing the power source button 18a, one of the special keys in the telephone terminal device (S1), a telephone number is inputted with the ten keys 19 so that the telephone number is stored in the telephone number temporary memory part 12 (S2).

After pressing the communication button 18c for calling (S3), the communication is held with the called counterpart (S4).

Thereafter, the special key 18a serving as both power source button and finish button is pressed for finishing the communication (S5).

After finishing the communication, as shown in FIG. 4, a list of the telephone directory names of "telephone directory 1", "telephone directory 2", "telephone directory 3", and "telephone directory 4" is indicated as four blocks (S6) on the display device 14 of the telephone device.

Here, the "telephone directory 1" serves as a telephone directory for the transmission record. As shown in FIGS. 5A and 5B, it comprises a plurality of memory areas for storing a plurality of telephone numbers such that an old telephone number is erased automatically when a new telephone number is inputted.

That is, for example, in the case a telephone number "09010000006" is inputted with the ten keys 19 to the telephone memory 13 of the "telephone directory 1" with 5 telephone numbers such as "09010000001" registered, as shown in FIG. 5B, the number is stored temporarily in the telephone number temporary memory part 12 according to the control by the control part 3 as well as the number "09010000001", which is the old datum, is eliminated from the telephone directory memory 13a and the number "09010000006", which is the new datum, is added instead.

The "telephone directory 2" erases the content registered in the memory after passage of a predetermined time according to a clock means and a time setting means (not illustrated) in the control part 3 by the memory automatic erasure controlling means 8 for automatically erasing the content registered in a specific telephone directory memory at the time optionally set with the ten keys 19.

The "telephone directory 3" registers telephone numbers successively. However, an old telephone number is not erased automatically, but it needs to be erased individually one by one.

The "telephone directory 4" registers a telephone number with the related information corresponding to the telephone number, such as the company name and the name added so as to be used like a memorandum.

The operation of selecting a telephone directory is executed with the ten keys 19. A program is set in the control part 3 comprising a microcomputer such that if the "telephone directory 1" is to be selected, it can be selected by pressing "1" of the ten key 19c, and if the "telephone directory 2" is to be selected, it can be selected by pressing "2" of the ten key 19d.

In the case the ten keys 19 are operated by the user in a predetermined time after display of the telephone directory list (S7), and the input from the ten keys 19 is the number information (s8), the telephone directory corresponding to the number is selected as the telephone directory for the registration (S9).

In the case the name information is to be added (S10), for example, the name information such as "John Mobile" as shown in FIG. 6 is registered in the telephone directory selected in S9 with the telephone number inputted by the user (S11).

Thereafter, the flow chart returns to the point A for the judgment on whether or not it is to be registered further in another telephone directory (S6).

In the case it is not to be registered in another telephone directory, the device comes out from the registration flow so as to be in the waiting state for calling or receipt (S12).

The above-mentioned operation can be executed also with the ten key 19 function switched to the scrolling function. That is, in the state of step 6 with the list of the telephone directory names displayed on the display device 14 as shown in FIG. 4, if the user presses the ten key/scrolling change-over switch 10, the signal inputted from the ten keys 19 is processed from the number information to the scrolling information by the key input signal switching means 6 shown in FIG. 1 in the control part 3.

Then, since the information inputted from the ten keys 19 is not number information (S8), the information inputted from the ten keys 19 is confirmed to be the scrolling command information (S13). In the case it is the scrolling command information, the telephone directory specified in scrolling is selected as the telephone directory for registering the data (S14).

Thereafter, addition of the name information is processed according the procedure from step 10 on.

The flow chart of FIG. 7 shows in what way the scrolling direction is commanded according to the press of either of the ten keys "1", "4", "7" and "8" after the display of the list of the telephone directory names.

In the case the pressed ten key is "1" (S21), the cursor 22 (FIG. 4) moves upward (S22).

In the case the pressed ten key is "4" (S23), the cursor 22 moves downward (S24).

In the case the pressed ten key is "7" (S25), the cursor 22 moves leftward (S26).

In the case the pressed ten key is "8" (S27), the cursor 22 moves rightward (S28).

In the invention, as shown in FIG. 4, the indication is given such that the "1" and "4" ten keys are surrounded by a frame 20 as a pair, and the "7" and "8" ten keys are surrounded by a frame 21 as a pair. Since the "1" and "4" ten keys are disposed in the up and down direction and the "7" and "8" ten keys are disposed in the right and left direction, it is easy for the user to recognize that the "1" and "4" ten keys are the scrolling keys in the up and down direction, and the "7", and "8" ten keys are the scrolling keys in the right and left direction.

Moreover, the "5" ten key adjacent to the ten keys "1", "4", "7" and "8" is used as the selection switch for selecting the telephone directory for the registration. A frame 23 surrounding the ten key "5" for the selection switch indication is provided for being distinguished from the other ten keys.

In FIG. 4, the thick line indicated on the display device 14 shows the cursor 22. By pressing any of the ten keys "1", "4", "7", and "8" as the scrolling keys, the cursor 22 moves among the "telephone directory 1", the "telephone directory 2", the "telephone directory 3", and the "telephone directory 4" in the up and down, and right and left directions.

For example, FIG. 4 shows the state with the cursor 22 at the "telephone directory 1". In the case the selection switch "5" is pressed in this state, the "telephone directory 1" is selected as the telephone directory for the registration. Moreover, if the ten key "8" is pressed in the state with the cursor 22 at the "telephone directory 1" as shown in FIG. 4, the cursor 22 moves rightward so that the cursor 22 is disposed at the "telephone directory 2". In the case the selection switch "5" is pressed in this state, the "telephone directory 2", is selected as the telephone directory for the registration.

If the ten key "4" is pressed in the state with the cursor 22 at the "telephone directory 1" as shown in FIG. 4, the cursor 22 moves downward so that the cursor 22 is disposed at the "telephone directory 3". Furthermore, if the ten key "8" is pressed in this state, the cursor 22 moves rightward so that the cursor 22 is disposed at the "telephone directory 4". In the case the selection switch "5" is pressed in this state, the "telephone directory 4" is selected as the telephone directory for the registration.

Accordingly, since the ten keys "1", "4", "7", "8" and "5" are adjacent with each other, by using the ten keys "1", "4", "7" and "8" as the scrolling keys in the invention, it is advantageous in that the operation can be enabled in the case the housing 17 is held between the palm and the thumb only by slightly moving the position of the thumb.

As mentioned above, the called telephone number can be registered in a telephone directory memory selected from the plurality of the telephone directory memories according to the demand.

Figure 8:
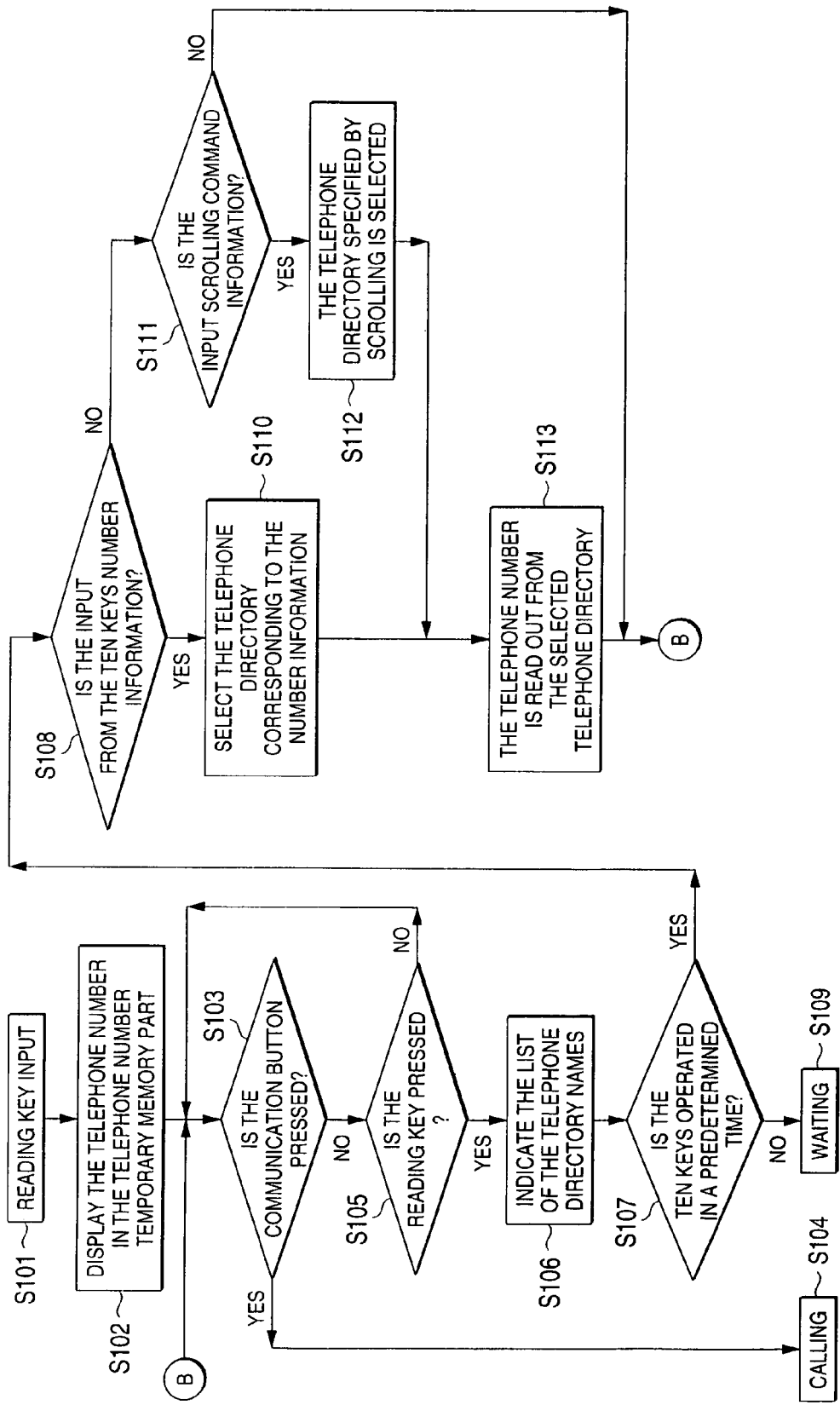
FIG. 8 is a flow chart of the calling operation in the telephone terminal device shown in FIG. 1.

FIG. 8 is a flow chart of the calling operation in the telephone terminal device shown in FIG. 1.

The case of reading a telephone number form a telephone directory for making a call will be explained with reference to FIG. 8. The explanation is given with the premise that telephone numbers are already registered in the telephone directories according the procedure described above.

The reading key 18b is pressed (S101). The control part 3 displays the telephone number inputted immediately before and temporarily stored in the telephone number temporary memory part 12 (S102).

In the case the communication button 18c is pressed (S103), the displayed telephone number is called (S104). In the case the communication button 18c is not pressed, whether the reading key 18b is pressed is judged again (S105).

In the case the reading key 18b is not pressed, press of the communication button 18c of the reading button 18b is monitored. In the case the reading key 18b is pressed, a list of the telephone directories is displayed on the display device 14 as shown in FIG. 4 (S106).

In the case a ten key 19 is pressed in a predetermined time in this state (S107), whether or not the input from the ten key 19 is the number information is confirmed (S108), and if a ten key 19 is not pressed in the predetermined time, the device returns to the waiting state (S109). In the case it is confirmed to be the number in formation in S108, the telephone directory corresponding to the number information is selected (S110).

The telephone directory can be selected also by scrolling the cursor 22 in the up and down, and right and left directions on the display device 14 with the ten keys 19 switched to be used as the scrolling keys 19 according to the ten key/scrolling change-over switch 10.

In the case the input from the ten keys is not the number information but the scrolling command information (S111), the telephone directory specified by scrolling is selected (112).

When the telephone directory is selected, as shown in FIG. 6, the telephone number is shown on the display device 14, and further with the related information in the case the related information thereof is registered. The telephone numbers registered in the same telephone directory are displayed successively on the display device 14.

In this embodiment, with the ten keys switched to have the scrolling key function, for example, the scrolling operation can be executed in the up and down direction by pressing the "1" or "4" ten key on the display device for displaying the telephone number to be called (S113).

For calling the displayed telephone number, the device returns to the point B of FIG. 8 so that if the communication button 18c is pressed (S103), it is called (S104).

By scrolling with the ten keys without pressing the communication button 18c at the point B of FIG. 8, the other telephone numbers other than the displayed telephone number can also be selected.

Furthermore, by pressing the reading key 18b instead of the communication button 18c at the point B of FIG. 8, the list of the telephone directories can be displayed on the display device 14 (S106) so that the telephone numbers in the other telephone directories can also be selected.

As mentioned above, the telephone numbers registered in the various telephone directories can be read out optionally for making a call.

According to the present embodiment, the usage of the telephone terminal device can be changed by optionally selecting the telephone directory memory according to the need.

That is, in the case of registration in the memory of the "telephone directory 1", the new telephone numbers called are added successively as well as the old ones are erased successively like the conventional devices so that the use as the conventional transmitted telephone number record can be provided.

In the case of registration in the memory of the "telephone directory 2", since all the telephone numbers registered in the memory as the transmitted telephone number record are erased automatically after passage of a predetermined time, by registering a telephone number with little possibility of calling again in the "telephone directory 2", it can be discarded without trouble after storing for the predetermined time. For example, by automatic erasure at 24:00 PM of the day, new transmission record data can be accumulated and registered daily.

In the case of registration in the memory of the "telephone directory 3", since erasure of the data can be judged individually one by one without successive erasure of the telephone numbers from the prior registration nor collective erasure after passage of a predetermined time, telephone numbers to be kept can be maintained semi-permanently.

Furthermore, in the case of registration in the memory of the "telephone directory 4", by registering the telephone number after the call with the company name or the name added thereto as a memorandum at the time of inputting a telephone number for making a call, the telephone directory data input and the registration operation for the name, or the like, can be executed at each call.

By optional selection among the various telephone directory memories for a called telephone number, the user can freely select different kinds of usage.

Moreover, in the case a means for automatically setting the telephone directory memory to be selected at each call is added to the control part 3, automatic registration in the telephone directory preset according to the preference of the user can be enabled without the need of manual selection from the "telephone directory 1" to the "telephone directory 4" after each call.

Second Embodiment

Next, a second embodiment of the invention will be explained with reference to drawings.

Figure 9:
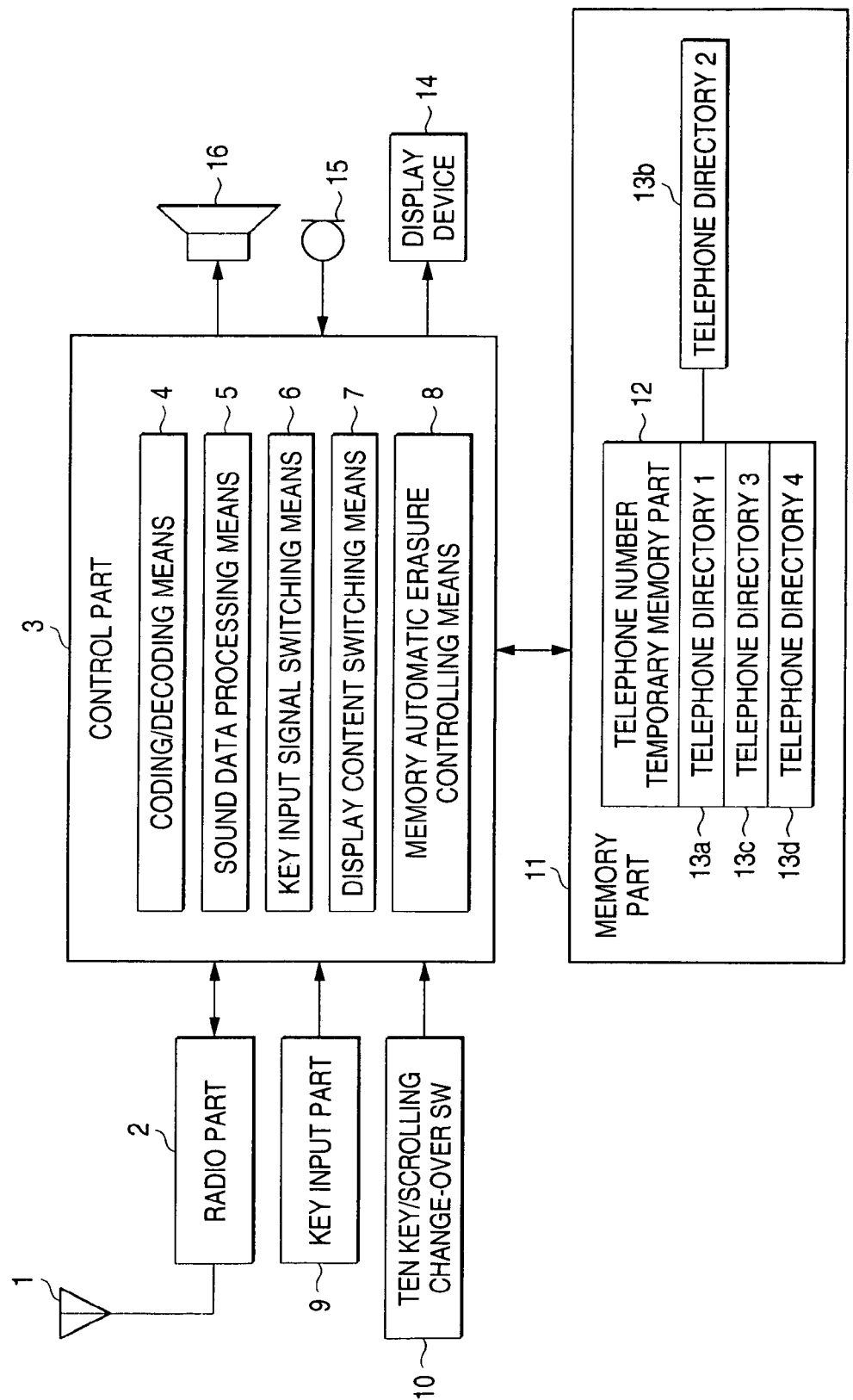
FIG. 9 is a block diagram showing the circuit configuration of a telephone terminal device according to the second embodiment of the invention.

FIG. 9 is a block diagram showing the circuit configuration of a telephone terminal device according to the second embodiment of the invention.

FIGS. 10A and 10B are charts showing the memory content of the telephone directory memory shown in FIG. 9.

The second embodiment shown in FIG. 9 differs from the first embodiment shown in the block diagram of FIG. 1 in that the "telephone directory 2" serves as the buffer memory of the "telephone directory 1".

In the telephone terminal device shown in FIG. 9, the "telephone directory 1" is a telephone directory for controlling both registration and erasure such that an older telephone number is erased subject to new registration of a telephone number with a constant number of telephone numbers to be registered therein as well as the "telephone directory 2" is a telephone directory for controlling automatic erasure of the registered telephone numbers after passage of a predetermined time. The "telephone directory 2" serves as the buffer memory of the "telephone directory 1" so that an old telephone number to be erased from the "telephone directory 1" is reregistered in the "telephone directory 2".

Therefore, the embodiment differs from the case of FIG. 1 in that the "telephone directory 2" is not comparable to the "telephone directory 1", but is subordinate to the "telephone directory 1". Therefore, in this case, since an old telephone number to be erased form the "telephone directory 1" can be reregistered in the "telephone directory 2" for storage for a predetermined time so that the old telephone numbers that has been erased in the conventional example can be stored for the predetermined time, an old telephone number can also be read out for making a call for the predetermined time.

FIGS. 10A and 10B show the state with the telephone number "009010000006" newly inputted with the ten keys so that the number "009010000006" is temporarily stored in the telephone directory temporary memory part 12 as well as the number "009010000006" is added to the telephone directory memory 13a after reregistering the old telephone number "009010000001" in the telephone directory memory 13a of the "telephone directory 1" to the telephone directory memory 13b of the "telephone directory 2".

Thereafter, after passage of a predetermined time, the number "009010000001" reregistered in the telephone directory memory 13b is erased automatically.

Third Embodiment

Next, a third embodiment of the invention will be explained with reference to drawings.

Figure 11:
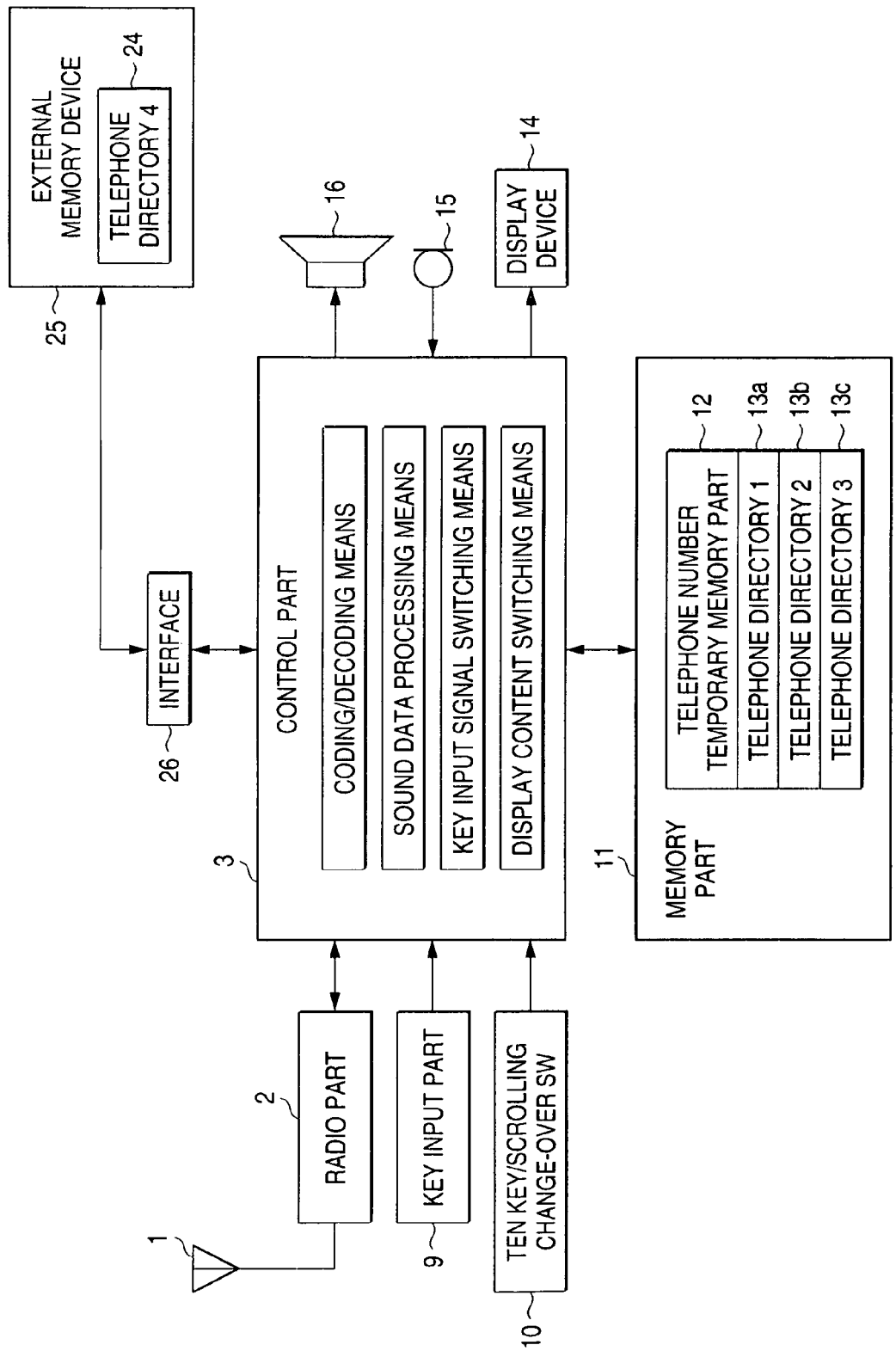
FIG. 11 is a block diagram showing the circuit configuration of the telephone terminal device according to the third embodiment of the invention.

FIG. 11 is a block diagram showing the circuit configuration of the telephone terminal device according to the third embodiment of the invention.

In the third embodiment shown in FIG. 11, the "telephone directory 4" comprises an external memory device 25 instead of an internal telephone directory memory. At the time of selecting a telephone directory memory, the "telephone directory 4" 24 of the external memory device 25 can also be selected via an interface 26 similar to the stored "telephone directory 1", "telephone directory 2" and "telephone directory 3". Accordingly, the memory capacity can be expanded.

Fourth Embodiment

Next, a fourth embodiment of the invention will be explained with reference to drawings.

Figure 12:
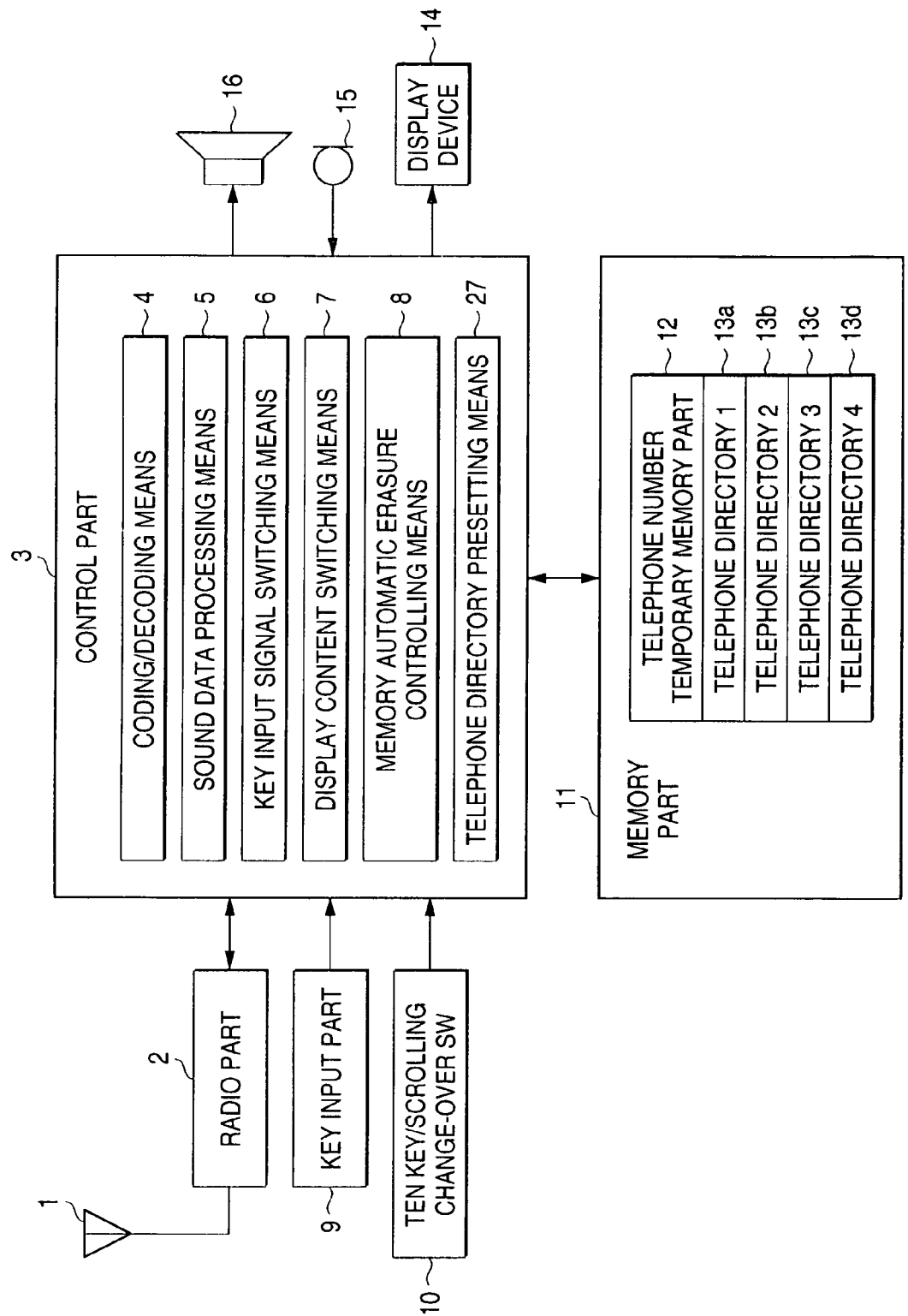
FIG. 12 is a block diagram showing the circuit configuration of the telephone terminal device according to the fourth embodiment of the invention.

FIG. 12 is a block diagram showing the circuit configuration of the telephone terminal device according to the fourth embodiment of the invention.

Figure 13:
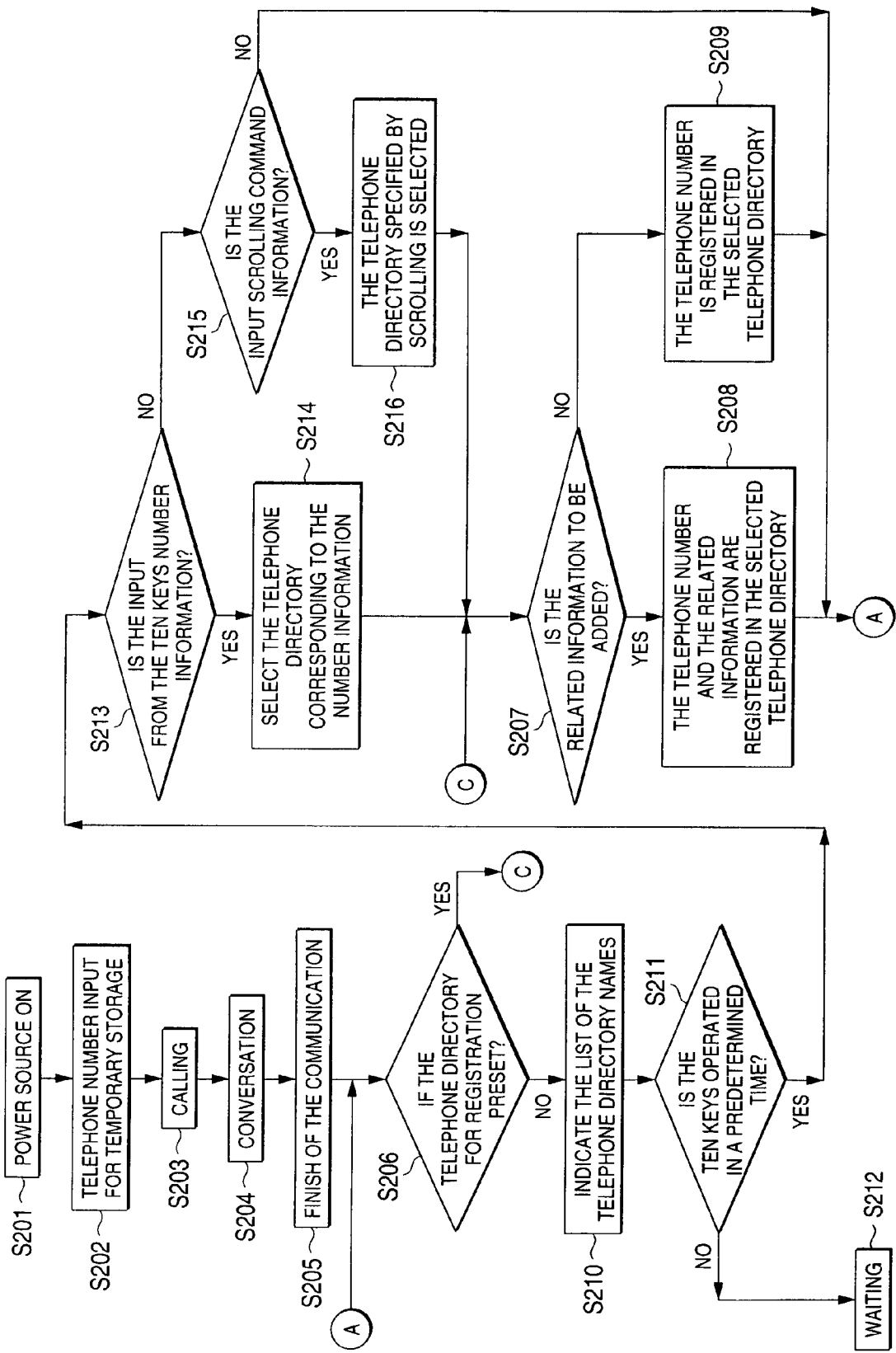
FIG. 13 is a flow chart of the registration operation of the telephone terminal device shown in FIG. 12.
Figure 14B:
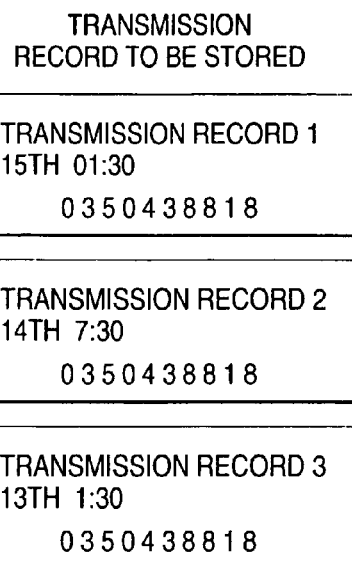
FIGS. 14A and 14B are explanatory charts of a transmission record in a conventional communication terminal device.
Figure 14A:
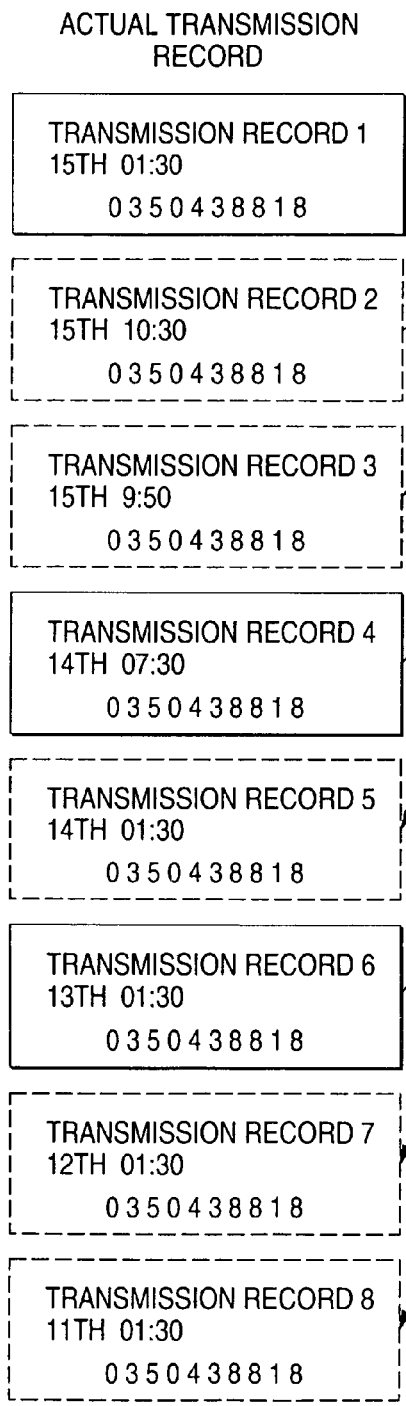

FIG. 13 is a flow chart of the operation of the telephone terminal device shown in FIG. 12.

The fourth embodiment shown in FIG. 12 further comprises a telephone directory presetting means 27 for setting the telephone directory for registering a telephone number. Accordingly, by preliminarily setting one from the "telephone directory 1" to the "telephone directory 4", the telephone number called can be registered automatically after each call in the telephone directory preliminarily set by the user. The other configuration is the same as that of FIG. 1.

With reference to FIG. 13, the registration procedure of a telephone number will be explained.

After turning on the power source (S201), inputting a telephone number with the ten keys so as to be stored in the telephone directory temporary memory part 12 (S202), making a call (S203), having a communication (S204), finishing the communication (S205), whether or not the telephone directory for registration is preset is confirmed (S206).

If it is preset by the telephone directory presetting means 27, it proceeds to the point C in the flow chart. In the case the related information is to be added (S207), the related information is inputted so as to be registered in the preset telephone directory with the telephone number (S208).

In the case the related information is not to be added, only the telephone number is registered in the preset telephone directory (S209).

Thereafter, it proceeds to the point A in the flow chart. In the case the telephone directory for further registration is not preset (S206), the list of the telephone directory names is displayed with the telephone directory selected surrounded by the cursor (S210), and without input from the ten keys after a predetermined time (S211), the device is in the waiting state (S212).

According to the present embodiment, by presetting the "telephone directory 4" for registration of the telephone number with the related information such as the name added thereto at the time of the purchase of the telephone terminal device, the telephone directory including the related information with the communication confirmation can be provided without an extra electronic telephone directory registration operation by just inputting the related information after each call.

As heretofore described, since a telephone number stored in the temporary storage memory is registered in one selected from the plurality of the telephone directories after making a call in the first aspect of the invention, the effect of optionally selecting the telephone directory memory for registering the called telephone number from the plurality of the telephone directories provided in the telephone terminal device according to the input with the ten keys can be achieved.

Moreover, since a telephone number stored in the temporary storage memory is registered after making a call, with the name and the information related to the telephone number added thereto in the second aspect of the invention, the effect of producing a telephone directory including the related information only by adding the related information to the telephone number with the calling confirmation can be achieved.

Furthermore, since the data of one of the telephone directories are erased automatically after passage of a predetermined time in the third aspect of the invention, the effect of accumulating and registering new transmission record data daily can be achieved by, for example, automatic erasure in each night.

Moreover, since in the case the telephone numbers overflowed beyond the capacity of the transmitted telephone number record memory can be registered in the buffer memory for a predetermined time in the fourth aspect of the invention, the effect of reading the telephone numbers from the buffer memory for redialing even after erasure from the transmitted telephone number record memory can be achieved within the predetermined time.

Furthermore, since one of the telephone directory memories comprises an external memory device connected via the interface means in the fifth and sixth aspects of the invention, the effect of expanding the telephone directory memory capacity can be achieved according to the use of the external memory device as the telephone directory memory. By connecting with a memory device such as an electronic handbook and a lap top personal computer as the external memory device, the effect of storing the called telephone number in the telephone directory memory utilizing the memory device of the electronic handbook or the lap top personal computer can be achieved.

Furthermore, since the telephone directory memory for registering the telephone number is selected manually in the seventh aspect of the invention, the effect of optionally and easily selecting the telephone directory memory for registering the telephone number after each call according to the characteristics of the called telephone number can be achieved.

Moreover, since the telephone number can be registered automatically in the preliminarily selected telephone directory memory after each call in the eighth aspect of the invention, the effect of automatically establishing the telephone directory data at each call at the time of the purchase of the telephone terminal device can be achieved.

What is claimed is:

1. A telephone terminal device comprising:
   a temporary storage memory for temporarily storing an inputted telephone number;
   a plurality of telephone directories including a plurality of user selectable directories for storing user selected phone numbers, each of the telephone directories associated with at least one telephone directory memory for storing input telephone numbers;
   wherein a telephone number stored in the temporary storage memory is registered in one of said at least one telephone directory memory associated with one of said user selectable directories selected from the plurality of telephone directories after making a call;
   a transmitted telephone number record directory memory for storing a plurality of called telephone numbers; and
   a buffer directory memory whose data are erased automatically after passage of a predetermined time;
   wherein telephone numbers are registered in the transmitted telephone number record directory memory in the order of calling, and in the case where the number of the telephone numbers to be registered exceeds the number capable of being stored in the transmitted telephone number record directory memory, the telephone number of the oldest registered telephone number or a telephone number specified by the user is transferred from the transmitted telephone number record directory memory to the buffer directory memory.

2. A telephone terminal device as claimed in claim 1, further comprising an interface means for connection with an external memory device external to said terminal device.

3. A telephone terminal device as claimed in claim 2, wherein at least one of said at least one telephone directory memory comprises the external memory device connected with a telephone terminal device main body via the interface means.

4. A telephone terminal device as claimed in claim 1, wherein said at least one telephone directory memory includes a plurality of telephone directory memories, and wherein the telephone directory memory for registering the telephone number stored in the temporary storage memory after a call is selected manually from one of the plurality of the telephone directory memories associated with the user selectable directories.

5. The telephone terminal device as claimed in claim 1, wherein one of the plurality of telephone directories is chosen in advance by a user for automatically storing the telephone number stored in the temporary storage memory after making or receiving a call.

6. A telephone terminal device comprising:
   a temporary storage memory for temporarily storing an inputted telephone number;
   a plurality of telephone directories including a plurality of user selectable directories for storing user selected phone numbers, each of the telephone directories associated with at least one telephone directory memory for storing input telephone numbers; wherein
   one of the plurality of telephone directories is chosen in advance by a user for automatically storing the telephone number stored in the temporary storage memory after making or receiving a call.

7. The telephone terminal device of claim 6, wherein said at least one telephone directory memory is an external memory.

8. The terminal device of claim 6, further comprising an interface means for connecting to an external memory device external to said terminal device for storing telephone numbers accessible by said terminal device.

9. The terminal device of claim 6, wherein name and information related to the telephone number registered are added thereto.

10. The terminal device of claim 6, wherein data of at least one of the telephone directories are erased automatically after passage of a predetermined time.

* * * * *